(12) United States Patent
Choi et al.

(10) Patent No.: US 6,808,696 B2
(45) Date of Patent: Oct. 26, 2004

(54) METHOD OF PREPARING NANOSIZED SPHERICAL VANADIUM OXIDE PARTICLE

(75) Inventors: Jae-young Choi, Suwon (KR); Do-young Seung, Seoul (KR); Duck-young Yoo, Suwon (KR); Min-seuk Kim, Seoul (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 273 days.

(21) Appl. No.: 10/106,458

(22) Filed: Mar. 27, 2002

(65) Prior Publication Data

US 2002/0192147 A1 Dec. 19, 2002

(30) Foreign Application Priority Data

Mar. 28, 2001 (KR) ........................................ 2001-16325
Nov. 26, 2001 (KR) ........................................ 2001-73735

(51) Int. Cl.$^7$ ............................................... C01G 31/00
(52) U.S. Cl. .................................................. 423/594.17
(58) Field of Search .................................... 423/594.17

(56) References Cited

U.S. PATENT DOCUMENTS 5,326,545 A 7/1994 Koksbang
6,328,947 B1 * 12/2001 Monden et al. ............. 423/611

* cited by examiner

*Primary Examiner*—Steven Bos
(74) *Attorney, Agent, or Firm*—Lee & Sterba, P.C.

(57) ABSTRACT

A method of preparing nanosized spherical vanadium oxide particles, comprising preparing a vanadium ion-containing aqueous solution by dissolving a vanadium ion-containing material; adding at least one solvent selected from a non-protonic, polar organic solvent and a glycol solvent to the vanadium ion-containing aqueous solution and mixing the same; and aging the mixture.

20 Claims, 4 Drawing Sheets

METHOD OF PREPARING NANOSIZED SPHERICAL VANADIUM OXIDE PARTICLE

BACKGROUND OF THE INVENTION

1. Field of the Invention

The present invention relates to a method of preparing nanosized spherical vanadium oxide particles and, more particularly, to a method of preparing nanosized spherical vanadium oxide particles having an average particle size of tens of nanometers using a sol-gel method.

2. Description of the Related Art

Divanadium pentaoxide ($V_2O_5$) particles are generally prepared using a solid phase method, a liquid phase method, or a vapor phase method. In the solid phase method, divanadium pentaoxide particles are derived from thermal decomposition of ammonium vanadate at a temperature of 400–600° C. This solid phase method is relatively easy to perform, but the resulting divanadium pentaoxide particles have irregular shapes and large particle size on the order of several micrometers.

When divanadium pentaoxide particles are prepared using the liquid phase method, there is an advantage of easy processing with efficient control of particle size, crystal phase, and specific surface area. However, the resulting divanadium pentaoxide particles are limited to planar or ribbon shapes, and thus spherical particles cannot be obtained using the liquid phase method.

The vapor phase method is divided according to the type of energy source, i.e., whether laser or plasma is used as an energy source. In preparing divanadium pentaoxide particles, the vapor phase method is difficult to control and is less economical than the liquid phase and solid phase methods.

Recently, there has been an increased interest in using nanosized particles in the development of new functional materials to improve the properties of existing active materials as well as to obtain new properties.

As electronic components have become smaller with increased performance requirements, the size of raw material particles for electronic components has also decreased to the order of submicrons or less. For a uniform and fine distribution of sintering additive particles in a green body, there is a need to reduce the size of the sintering additive particles to a fine level. Reportedly, performance of a sensor is improved by reducing the size of source particles with the effect of increasing active surface area.

Divanadium pentaoxide particles have great electrochemical activity. Thus, divanadium pentaoxide particles are used as catalysts, electrochromic devices, anti-static coating materials, and active materials for sensors and secondary cells. Discharge capacity of a secondary cell can be improved by using a nanosized, ribbon-shaped active material, compared to a secondary cell manufactured using a microsized active material. In additon to the application as active materials for secondary cells, nanosized divanadium pentaoxide particles are expected to show improved performance in applications of catalysts, electrochromic devices, anti-static coating materials, and active materials for sensors. In the above and other applications, spherical particles are needed for better mixing, dispersion, or forming processes. Accordingly, for commercial applications of nanosized divanadium pentaoxide particles, there exists a need for an economic and efficient method for preparing nanosized divanadium pentaoxide particles.

Up to now, however, an economic and efficient method of preparing nanosized divanadium pentaoxide particles having a spherical shape has not been developed.

SUMMARY OF THE INVENTION

According to a primary feature of the present invention, a method of preparing nanosized spherical divanadium pentaoxide particles comprises, preparing a vanadium ion-containing aqueous solution by dissolving a vanadium ion-containing material; adding at least one solvent selected from a non-protonic, polar organic solvent and a glycol solvent to the vanadium ion-containing aqueous solution and mixing the same; and aging the mixture.

In preparing the vanadium ion-containing aqueous solution, the vanadium ion-containing material is dissolved in a hydrogen peroxide aqueous solution or an acid aqueous solution. Although the type of the acid aqueous solution that may be used is not limited, a hydrochloric acid aqueous solution, a nitric acid aqueous solution, or a sulfuric acid aqueous solution is preferred.

Preferably, the amount of hydrogen peroxide in the hydrogen peroxide aqueous solution or the amount of acid in the acid aqueous solution is in the range of about 0.5 to 5 times the amount of vanadium ion-containing material in order to fully dissolve the vanadium ion-containing material. If the amount of hydrogen peroxide or the amount of acid exceeds the above stated range, it becomes uneconomical due to a relative low concentration of vanadium ions. If the amount of hydrogen peroxide or the amount of acid is less than the above stated range, it becomes difficult to fully dissolve the vanadium ion-containing material.

Preferably, the vanadium ion-containing aqueous solution contains between about 0.01 to 0.5 M vanadium ion.

In accordance with a preferred embodiment of the present invention, the non-protonic, polar organic solvent is at least one selected from the group consisting of N-methyl-2-pyrrolidone, N,N-dimethylacetamide, hexamethylphosphoamide, and pyridine, and the glycol solvent comprises at least one selected from the group consisting of ethyleneglycol, propyleneglycol, and butyleneglycol. The amount of the solvent is in a preferred range of about 60–98% by volume based on the total volume of the vanadium ion-containing aqueous solution and the solvent.

Aging of the mixture is performed preferably for about 0.5 to 100 hours at a temperature not less than 0° C. and not greater than the higher of the boiling point of the vanadium ion-containing aqueous solution and the boiling point of the solvent.

In the method for preparing vanadium oxide particles according to the present invention, any vanadium ion-containing material can be used without limitations, but divanadium pentaoxide is preferred.

These and other features and aspects of the present invention will be readily apparent to those of ordinary skill in the art upon review of the detailed description that follows.

BRIEF DESCRIPTION OF THE DRAWINGS

The above features and advantages of the present invention will become more apparent by describing in detail preferred embodiments thereof with reference to the attached drawings in which.

DETAILED DESCRIPTION OF THE INVENTION

Figure 1:
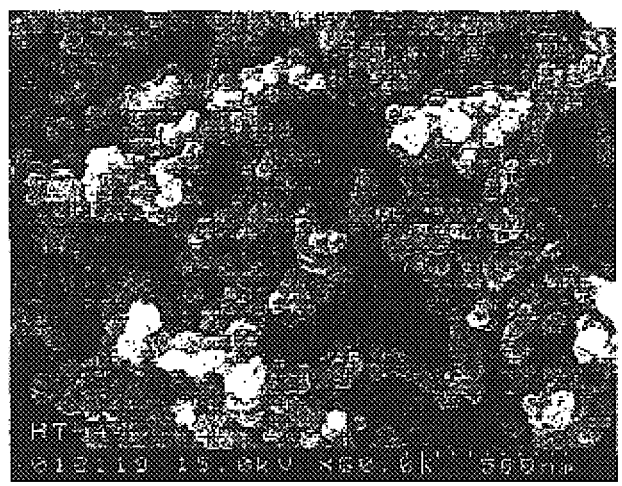
FIG. 1 is a scanning electron microscopic (SEM) photograph of divanadium pentaoxide ($V_2O_5$) particles prepared in Example 1 in accordance with the present invention.

Korean Patent Application No. 2001-16325 filed Mar. 28, 2001, and entitled "Method of Preparing Nanosized Spherical Vanadium Oxide Particle," and Korean Patent Application No. 2001-73735, filed Nov. 26, 2001, and entitled "Method of Preparing Nanosized Sperical Vanadium Oxide Particle," are incorporated by reference herein in their entirety.

In a sol-gel method, formation of particles involves nucleation through hydrolysis and condensation and growth of the nuclei. The shape, particle size, and particle size distribution of the resulting particles are affected by reaction factors and conditions during nucleation and growth. Therefore, adjustment of the reaction conditions and factors is required to form particles having a desired shape, particle size, and particle size distribution.

It is known that formation of particles having a particular orientation on a crystal plane using the sol-gel method is greatly affected by growth. When a particular oriented crystal plane of a material has the lowest surface energy in a reaction solvent among other crystal planes in the growth step, the particular oriented crystal plane grows first to reduce the system energy such that growth of other crystal planes is suppressed. The resulting particles are surrounded by the particular oriented crystal plane having the lowest surface energy in the reaction solvent so that they have a non-spherical shape. In contrast, when all the crystal planes of a material have the same surface energy in a reaction solvent, nuclei growth occurs in every direction, and the resulting particles having a spherical shape. Therefore, to form spherical divanadium pentaoxide particles using a liquid phase method including a sol-gel method, the surface energy of all crystal planes of divanadium pentaoxide in a reaction solvent should be equal.

The surface energy of an oriented crystal plane of a material in a reaction solvent can be varied by adsorbing a surfactant to the oriented crystal plane or by changing the reaction solvent.

In the present invention, a mixed solvent of water and a non-protonic, polar organic solvent and/or a mixed solvent of water and glycol are used as the reaction solvent to obtain nanosized spherical divanadium pentaoxide particles. Suitable non-protonic, polar organic solvents include N-methyl-2-pyrrolidone, N,N-dimethylacetamide, hexamethylphosphoamide, pyridine, and mixtures of these solvents. Suitable glycols include ethyleneglycol, propyleneglycol, butyleneglycol, and mixtures of these materials. The amount of the reaction solvent is in a preferred range of about 60 to 98% by volume based on the total volume of a vanadium ion-containing aqueous solution and the reaction solvent.

A method of preparing nanosized spherical divanadium pentaoxide particles using a sol-gel method according to the present invention will now be described below.

First, a vanadium ion-containing aqueous solution is prepared by dissolving a vanadium ion-containing material in an aqueous solution. When divanadium pentaoxide is used as the vanadium ion-containing aqueous material, the vanadium ion-containing aqueous solution is prepared by dissolving divanadium pentaoxide in a hydrogen peroxide aqueous solution or an acid aqueous solution such as a hydrochloric acid aqueous solution, a nitric acid aqueous solution, or a sulfuric acid aqueous solution. Preferably, the vanadium ion-containing aqueous solution is prepared by dissolving divanadium pentaoxide in the hydrogen peroxide aqueous solution. Benefits of using the hydrogen peroxide aqueous solution include ease of use without residual ions.

Although the concentrations of the hydrogen peroxide aqueous solution and the acid aqueous solution are not limited, it is preferred that the concentration of the hydrogen peroxide aqueous solution is 30%, 30 to 32%, 35%, or 50% by weight, while it is preferred that the concentration of the acid aqueous solution is 20%, 37%, or 38% by weight for the hydrochloric acid aqueous solution, 70% or 90% by weight for the nitric acid aqueous solution, and 95 to 98% or 98% by weight for the sulfuric acid aqueous solution.

Preferably, the vanadium ion-containing aqueous solution contains about 0.01M to 0.5M vanadium ion. If the concentration of the vanadium ion is less than 0.01M, it is undesirable for economical reasons. If the concentration of the vanadium ion exceeds 0.5M, it is undesirable for the shape of divanadium pentaoxide particles in the vanadium ion-containing aqueous solution.

The prepared vanadium ion-containing aqueous solution is mixed with a non-protonic, polar organic solvent and/or a glycol solvent. Suitable non-protonic, polar organic solvents include N-methyl-2-pyrrolidone, N,N-dimethylacetamide, hexamethylphosphoamide, pyridine, and mixtures of these solvents. Suitable glycol solvents include ethyleneglycol, propyleneglycol, butyleneglycol, and mixtures of these materials.

The amount of the solvent is in a preferred range of 60–98% by volume based on the total volume of the vanadium ion-containing aqueous solution and the solvent. If the amount of the solvent is less than 60% by volume, it is undesirable from the standpoint of the shape of the resulting divanadium pentaoxide particles. If the amount of the solvent exceeds 98% by volume, it is uneconomical because of a too low of a vanadium ion concentration.

Next, the mixture of the vanadium ion-containing aqueous solution and the non-protonic, polar organic solvent, the mixture of the vanadium ion-containing aqueous solution and the glycol solvent, or the mixture of the vanadium ion-containing aqueous solution, the non-protonic, polar organic solvent, and the glycol solvent is aged at a temperature, preferably no less than 0° C. and no greater than the higher of the boiling point of the vanadium ion aqueous solution and the boiling point of the solvent. Preferably, aging is performed for 0.5–100 hours. If the aging time is less than 0.5 hours, divanadium pentaoxide particles cannot be formed. If the aging time exceeds 100 hours, it is undesirable for economical reasons. If the aging temperature is less than 0° C., the reaction rate is too slow or the divanadium pentaoxide generation reaction itself does not occur. If the aging temperature exceeds the upper limit, an additional hydrothermal reactor is needed to suppress excess evaporation of the solvent or water from the reaction mixture.

After the aging is completed, precipitates are filtered from the reaction product and dried to obtain divanadium pentaoxide particles according to the present invention.

According to the preparation method described above, spherical divanadium pentaoxide particles having an average particle size of tens of nanometers, and particularly 30–80 nm, can be prepared efficiently and economically.

EXAMPLE 1

4.5728 g of cystalline divanadium pentaoxide ($V_2O_5$) granules (99.6% purity) was placed in a beaker containing 150 ml of distilled water. 25 ml of 30% (by weight) hydrogen peroxide ($H_2O_2$) solution was added to the solution and thoroughly mixed to fully dissolve $V_2O_5$. Next, distilled water was added making the total volume of the reaction mixure 200 ml to prepare a vanadium ion-containing aqueous solution containing 0.5M vanadium ion.

40 ml of the vanadium ion-containing aqueous solution was added into a reaction container containing 160 ml of N-methyl-2-pyrrolidone and mixed. The reaction container was plugged and aged for 12 hours in a thermostatic bath at 80° C.

After aging, precipitants were filtered from the reaction product and dried in a dry chamber at 60° C. to prepare divanadium pentaoxide particles.

Figure 2:
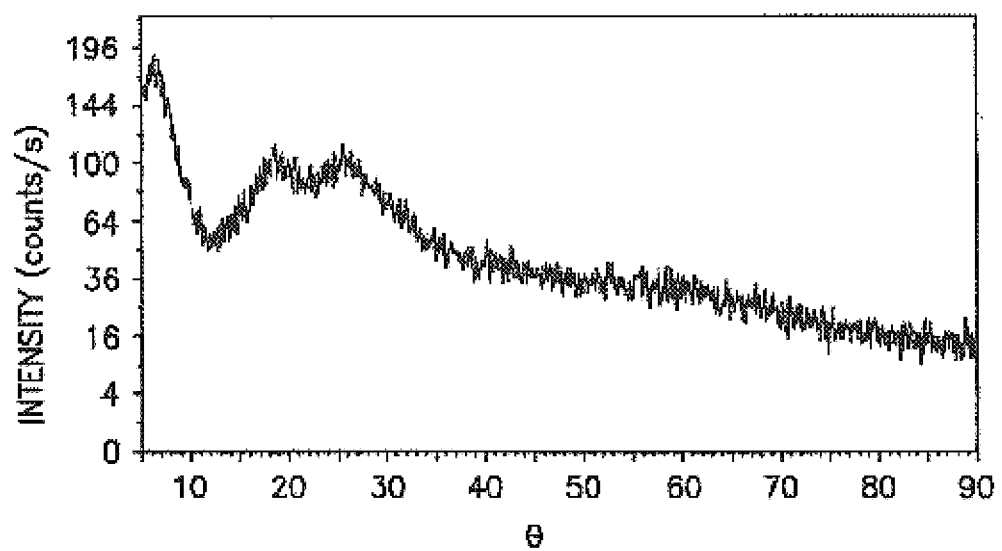
FIG. 2 is a graph illustrating an X-ray diffraction pattern of divanadium pentaoxide particles prepared in Example 1 in accordance with the present invention.

A scanning electron microscopic (SEM) photograph and a graph illustrating an X-ray diffraction pattern for the divanadium pentaoxide particles prepared in Example 1 are shown in FIGS. 1 and 2, respectively. FIG. 1 shows that the divanadium pentaoxide particles prepared in Example 1 are spherical with an average particle size of about 40 nm. The result of the X-ray diffraction analysis illustrated in FIG. 2 shows that the divanadium pentaoxide particles prepared in Example 1 are amorphous.

A vanadium-to-oxygen ratio was measured for the divanadium pentaoxide particles prepared in Example 1 using an inductively coupled plasma emission spectrometer. The divanadium pentaoxide particles prepared in Example 1 had a vanadium-oxygen ratio of 2:5 by mole.

EXAMPLE 2

Divanadium pentaoxide particles were prepared in the same manner as in Example 1, except that the concentration of vanadium ion was 0.2M. Physical properties of the divanadium pentaoxide particles were determined. As a result, the divanadium pentaoxide particles prepared in Example 2 were spherical and amorphous and had an average particle size of about 40 nm.

EXAMPLE 3

Divanadium pentaoxide particles were prepared in the same manner as in Example 1, except that the concentration of vanadium ion was 0.1M. Physical properties of the divanadium pentaoxide particles were determined. As a result, the divanadium pentaoxide particles prepared in Example 3 were spherical and amorphous and had an average particle size of about 35 nm.

EXAMPLE 4

Divanadium pentaoxide particles were prepared in the same manner as in Example 1, except that the concentration of vanadium ion was 0.01M. Physical properties of the divanadium pentaoxide particles were determined. As a result, the divanadium pentaoxide particles prepared in Example 4 were spherical and amorphous and had an average particle size of about 30 nm.

EXAMPLE 5

Figure 3:
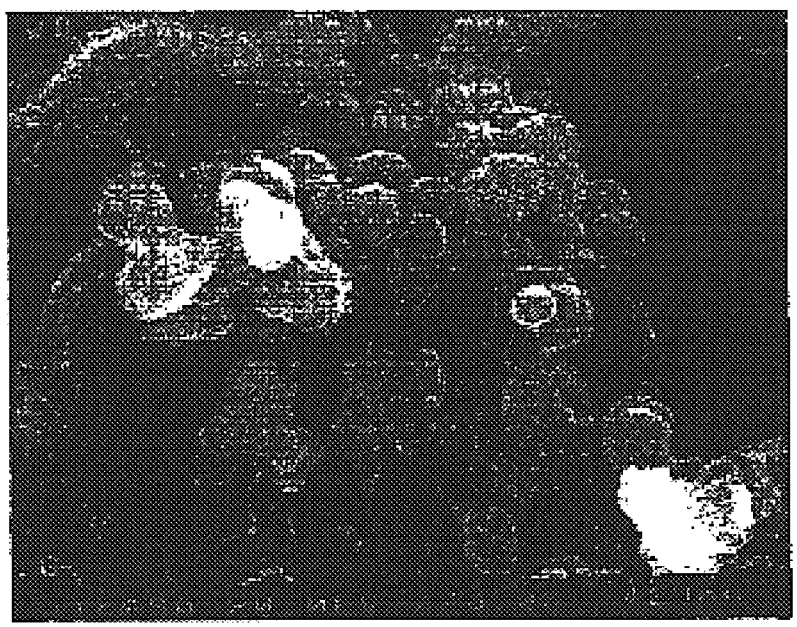
FIG. 3 is a SEM photograph of divanadium pentaoxide particles prepared in Example 5 in accordance with the present invention.

Divanadium pentaoxide particles were prepared in the same manner as in Example 1, except that N,N-dimethylacetamide instead of N-methyl-2-pyrrolidone was used. Physical properties of the divanadium pentaoxide particles were determined. A SEM photograph of the divanadium pentaoxide particles prepared in Example 5 is shown in FIG. 3. As shown in FIG. 3, the divanadium pentaoxide particles prepared in Example 5 were spherical and crystalline and had an average particle size of about 80 nm.

EXAMPLE 6

Figure 4:
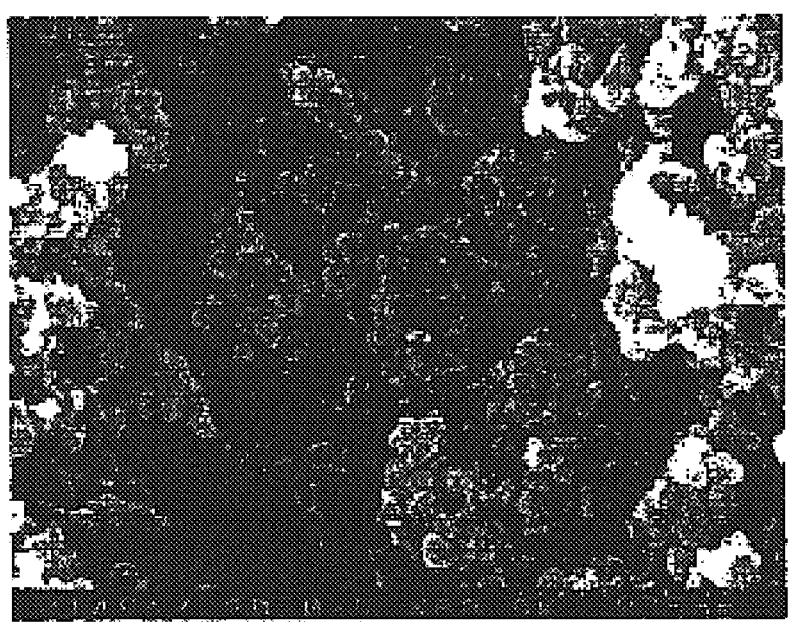
FIG. 4 is a SEM photograph of divanadium pentaoxide particles prepared in Example 6 in accordance with the present invention.

Divanadium pentaoxide particles were prepared in the same manner as in Example 1, except that hexamethylphosphoamide instead of N-methyl-2-pyrrolidone was used. A SEM photograph of the divanadium pentaoxide particles prepared in Example 6 is shown in FIG. 4. As shown in FIG. 4, the divanadium pentaoxide particles prepared in Example 6 were spherical and crystalline and had an average particle size of about 40 nm.

EXAMPLE 7

Figure 5:
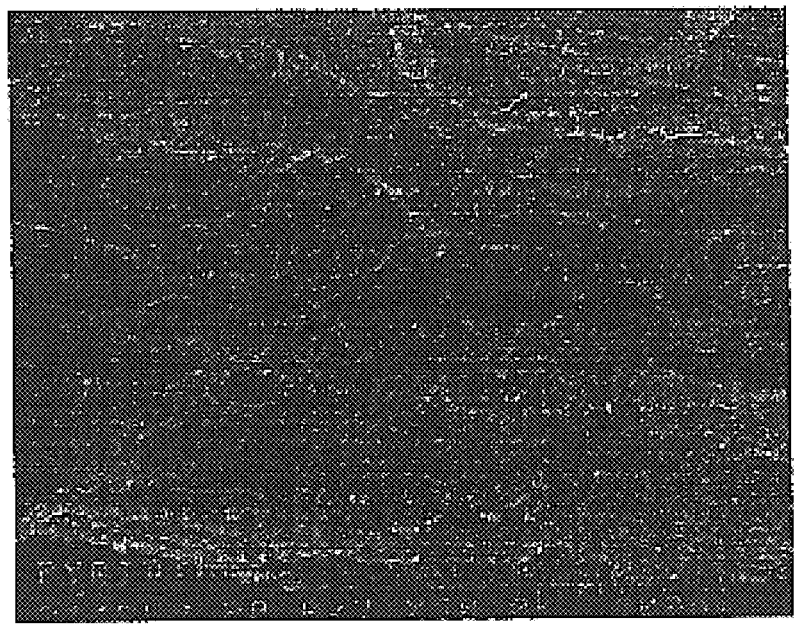
FIG. 5 is a SEM photograph of divanadium pentaoxide particles prepared in Example 7 in accordance with the present invention.

Divanadium pentaoxide particles were prepared in the same manner as in Example 1, except that pyridine instead of N-methyl-2-pyrrolidone was used. A SEM photograph of the divanadium pentaoxide particles prepared in Example 7 is shown in FIG. 5. As shown in FIG. 5, the divanadium pentaoxide particles prepared in Example 7 were spherical and had an average particle size of about 40 nm. The divanadium pentaoxide particles prepared in Example 7 also included 50% or less needle-shaped or rod shaped particles having an average diameter size of about 40 nm.

EXAMPLE 8

Figure 6:
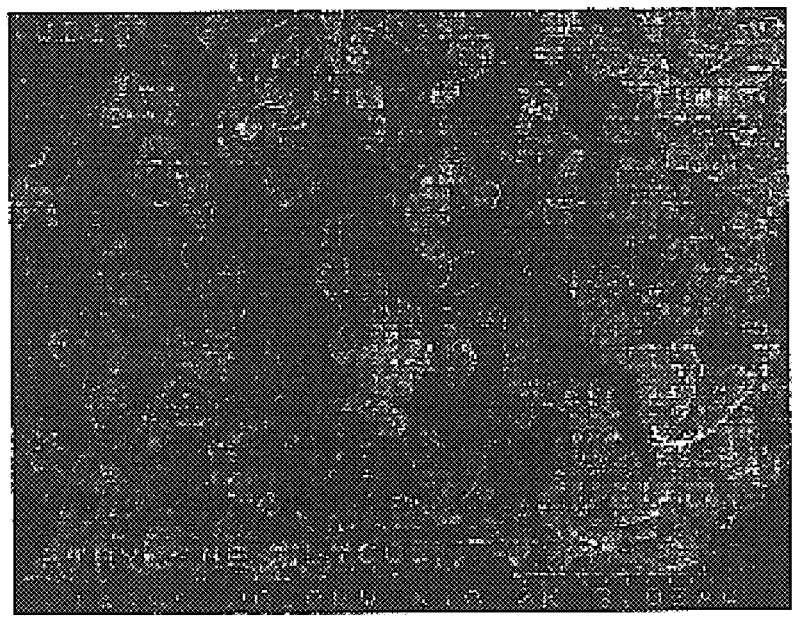
FIG. 6 is a SEM photograph of divanadium pentaoxide particles prepared in Example 8 in accordance with the present invention.

Divanadium pentaoxide particles were prepared in the same manner as in Example 1, except that ethyleneglycol instead of N-methyl-2-pyrrolidone was used. A SEM photograph of the divanadium pentaoxide particles prepared in Example 8 is shown in FIG. 6. As shown in FIG. 6, the divanadium pentaoxide particles prepared in Example 8 were spherical and amorphous and had an average particle size of about 80 nm.

EXAMPLE 9

Divanadium pentaoxide particles were prepared in the same manner as in Example 1, except that 4 ml of the vanadium ion-containing solution and 196 ml of N-methyl-2-pyrrolidone were used. Physical properties of the divanadium pentaoxide particles were determined. As a result, the divanadium pentaoxide particles prepared in Example 9 were spherical and amorphous and had an average particle size of about 30 nm.

EXAMPLE 10

Divanadium pentaoxide particles were prepared in the same manner as in Example 1, except that 60 ml of the vanadium ion-containing solution and 140 ml of N-methyl-2-pyrrolidone were used. Physical properties of the divanadium pentaoxide particles were determined. As a result, the divanadium pentaoxide particles prepared in Example 10 were spherical and amorphous and had an average particle size of about 40 nm.

EXAMPLE 11

Divanadium pentaoxide particles were prepared in the same manner as in Example 1, except that 80 ml of the vanadium ion-containing solution and 120 ml of N-methyl-2-pyrrolidone were used. Physical properties of the divanadium pentaoxide particles were determined. As a result, the divanadium pentaoxide particles prepared in Example 11 were spherical and amorphous and had an average particle size of about 40 nm.

EXAMPLE 12

Divanadium pentaoxide particles were prepared in the same manner as in Example 1, except that aging was performed at 20° C. Physical properties of the divanadium pentaoxide particles were determined. As a result, the divanadium pentaoxide particles prepared in Example 12 were spherical and amorphous and had an average particle size of about 40 nm.

EXAMPLE 13

Divanadium pentaoxide particles were prepared in the same manner as in Example 1, except that 25 ml of 98% (by weight) sulfuric acid aqueous solution instead of 25 ml of 30% (by weight) $H_2O_2$ aqueous solution was used. The physical properties of the divanadium pentaoxide particles were determined. As a result, the divanadium pentaoxide particles prepared in Example 13 were spherical and amorphous and had an average particle size of about 40 nm.

EXAMPLE 14

Divanadium pentaoxide particles were prepared in the same manner as in Example 1, except that propyleneglycol instead of N-methyl-2-pyrrolidone was used. Physical properties of the divanadium pentaoxide particles were determined. As a result, the divanadium pentaoxide particles prepared in Example 14 were spherical and amorphous with an average particle size of about 40 nm.

Comparative Example 1

Divanadium pentaoxide particles were prepared in the same manner as in Example 1, except that water instead of the organic solvent (N-methyl-2-pyrrolidone) was used. Physical properties of the divanadium pentaoxide particles were determined.

Figure 7:
FIG. 7 is a SEM photograph of divanadium pentaoxide particles prepared in Comparative Example 1.
Figure 8:
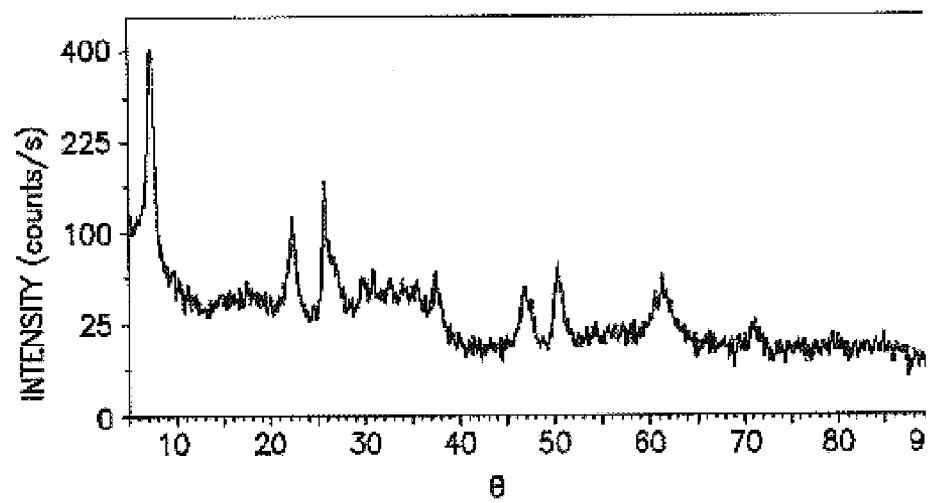
FIG. 8 is a graph illustrating an X-ray diffraction pattern of divanadium pentaoxide particles prepared in Comparative Example 1.

A SEM photograph and a graph illustrating an X-ray diffraction pattern for the divanadium pentaoxide particles prepared in Comparative Example 1 are shown in FIGS. 7 and 8, respectively. FIG. 7 shows that the divanadium pentaoxide particles prepared in Comparative Example 1 have a ribbon shape. The result of the X-ray diffraction analysis illustrated in FIG. 8 shows that the divanadium pentaoxide particles prepared in Comparative Example 1 are crystalline.

Comparative Example 2

Divanadium pentaoxide particles were prepared in the same manner as in Example 1, except that aging was not performed. As a result, the particle generation reaction did not occur.

The experimental conditions for the preparation of divanadium pentaoxide particles in Examples 1 through 14 and Comparative Example 1 and 2 are summarized in Table 1. The result of the physical property determination for the divanadium pentaoxide particles prepared in Examples 1 through 14 and Comparative Examples 1 and 2 are summarized in Table 2.

TABLE 1

| Example | Vanadium ion concentration (M) | Reaction Solvent | Amount of Solvent (% by volume) | Aging Conditions |
|---|---|---|---|---|
| Example 1 | 0.5 | N-methyl-2-pyrrolidone | 80 | 80° C. for 12 hours |
| Example 2 | 0.2 | N-methyl-2-pyrrolidone | 80 | 80° C. for 12 hours |
| Example 3 | 0.1 | N-methyl-2-pyrrolidone | 80 | 80° C. for 12 hours |
| Example 4 | 0.01 | N-methyl-2-pyrrolidone | 80 | 80° C. for 12 hours |
| Example 5 | 0.5 | N,N-dimethylacetamide | 80 | 80° C. for 12 hours |
| Example 6 | 0.5 | Hexamethylphosphoamide | 80 | 80° C. for 12 hours |
| Example 7 | 0.5 | Pyridine | 80 | 80° C. for 12 hours |
| Example 8 | 0.5 | Ethyleneglycol | 80 | 80° C. for 12 hours |
| Example 9 | 0.5 | N-methyl-2-pyrrolidone | 98 | 80° C. for 12 hours |
| Example 10 | 0.5 | N-methyl-2-pyrrolidone | 70 | 80° C. for 12 hours |
| Example 11 | 0.5 | N-methyl-2-pyrrolidone | 60 | 80° C. for 12 hours |
| Example 12 | 0.5 | N-methyl-2-pyrrolidone | 80 | 20° C. for 12 hours |
| Example 13 | 0.5 | N-methyl-2-pyrrolidone | 80 | 80° C. for 12 hours |
| Example 14 | 0.5 | Propyleneglycol | 80 | 80° C. for 12 hours |
| Comparative Example 1 | 0.5 | $H_2O$ | 80 | 80° C. for 12 hours |
| Comparative Example 2 | 0.5 | N-methyl-2-pyrrolidone | 80 | No aging |

TABLE 2

| Example | Particle Shape | Average Particle Size (nm) | Crystal Phase |
|---|---|---|---|
| Example 1 | Spherical | 40 | Amorphous |
| Example 2 | Spherical | 40 | Amorphous |
| Example 3 | Spherical | 35 | Amorphous |
| Example 4 | Spherical | 30 | Amorphous |
| Example 5 | Spherical | 80 | Crystalline |
| Example 6 | Spherical | 40 | Crystalline |
| Example 7 | Spherical and Needle-like | 50 | Crystalline |

TABLE 2-continued

| Example | Particle Shape | Average Particle Size (nm) | Crystal Phase |
|---|---|---|---|
| Example 8 | Spherical | 80 | Amorphous |
| Example 9 | Spherical | 30 | Amorphous |
| Example 10 | Spherical | 40 | Amorphous |
| Example 11 | Spherical | 40 | Amorphous |
| Example 12 | Spherical | 40 | Amorphous |
| Example 13 | Spherical | 40 | Amorphous |
| Example 14 | Spherical | 40 | Amorphous |
| Comparative Example 1 | Ribbon-like | — | Crystalline |
| Comparative Example 2 | | No reaction | |

As shown in Table 2, spherical vanadium pentaoxide particles having an average particle size of 30–80 nm were prepared in Examples 1 through 14. In contrast, divanadium pentaoxide particles prepared in Comparative Example 1 using water instead of the organic solvent had a ribbon shape. In Comparative Example 2 where aging was not performed, vanadium pertoxide particles could not be formed because no reaction took place.

As described above, in the preparation of divanadium pentaoxide particles by the sol-gel method according to the present invention, a mixed solvent of water and a non-protonic, polar organic solvent or a mixed solvent of water and a glycol are used as a reaction solvent so that spherical divanadium pentaoxide particles having an average particle size of tens of nanometers can be prepared efficiently and economically.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of preparing vanadium oxide particles, comprising:
   (A) preparing a vanadium ion-containing aqueous solution by dissolving divanadium pentaoxide ($V_2O_5$);
   (B) adding at least one solvent selected from the group consisting of a non-protonic, polar organic solvent and a glycol solvent to the vanadium ion-containing aqueous solution and mixing the same; and
   (C) aging the mixture.

2. The method of preparing vanadium oxide particles as claimed in claim 1, wherein, in (B), the non-protonic, polar organic solvent is at least one selected from the group consisting of N-methyl-2-pyrrolidone, N,N-dimethylacetamide, hexamethylphosphoamide, and pyridine, and the glycol solvent comprises at least one selected from the group consisting of ethyleneglycol, propyleneglycol, and butyleneglycol.

3. The method of preparing vanadium oxide particles as claimed in claim 1, wherein the amount of the solvent is in the range of 60–98% by volume based on the total volume of the vanadium ion-containing aqueous solution and the solvent.

4. The method of preparing vanadium oxide particles as claimed in claim 1, wherein the vanadium ion-containing aqueous solution in (A) contains vanadium ion in the range of 0.01–0.5 M.

5. The method of preparing vanadium oxide particles as claimed in claim 1, wherein, in (A), the divanadium pentaoxide ($V_2O_5$) is dissolved in a hydrogen peroxide aqueous solution or an acid aqueous solution.

6. The method of preparing vanadium oxide particles as claimed in claim 5, wherein the acid aqueous solution is selected from the group consisting of hydrochloric acid aqueous solution, nitric acid aqueous solution, and sulfuric acid aqueous solution.

7. The method of preparing vanadium oxide particles as claimed in claim 5, wherein, in (A), the amount of hydrogen peroxide in the hydrogen peroxide aqueous solution or the amount of the acid in the acid aqueous solution is in the range of 0.5–5 times the divanadium pentaoxide ($V_2O_5$).

8. The method of preparing vanadium oxide particles as claimed in claim 1, wherein aging in (C) is performed for 0.5–100 hours at a temperature not less than 0° C. and not greater than the higher of the boiling point of the vanadium ion-containing aqueous solution and the boiling point of the solvent.

9. A method of preparing vanadium oxide particles, comprising:
   (A) preparing a vanadium ion-containing aqueous solution containing 0.01M–0.5M vanadium ion by dissolving divanadium pentaoxide ($V_2O_5$);
   (B) adding at least one solvent selected from the group consisting of a non-protonic, polar organic solvent and a glycol solvent to the vanadium ion-containing aqueous solution and mixing the same; and
   (C) aging the mixture.

10. The method of preparing vanadium oxide particles as claimed in claim 9, wherein, in (B), the non-protonic, polar organic solvent is at least one selected from the group consisting of N-methyl-2-pyrrolidone, N,N-dimethylacetamide, hexamethylphosphoamide, and pyridine, and the glycol solvent comprises at least one selected from the group consisting of ethyleneglycol, propyleneglycol, and butyleneglycol.

11. The method of preparing vanadium oxide particles as claimed in claim 9, wherein the amount of the solvent is in the range of 60–98% by volume based on the total volume of the vanadium ion-containing aqueous solution and the solvent.

12. The method of preparing vanadium oxide particles as claimed in claim 9, wherein, in (A), the divanadium pentaoxide ($V_2O_5$) is dissolved in a hydrogen peroxide aqueous solution or an acid aqueous solution.

13. The method of preparing vanadium oxide particles as claimed in claim 12, wherein the acid aqueous solution is selected from the group consisting of hydrochloric acid aqueous solution, nitric acid aqueous solution, and sulfuric acid aqueous solution.

14. The method of preparing vanadium oxide particles as claimed in claim 12, wherein, in (A), the amount of hydrogen peroxide in the hydrogen peroxide aqueous solution or the amount of the acid in the acid aqueous solution is in the range of 0.5–5 times the divanadium pentaoxide ($V_2O_5$).

15. The method of preparing vanadium oxide particles as claimed in claim 9, wherein aging in (C) is performed for 0.5–100 hours at a temperature not less than 0° C. and not greater than the higher of the boiling point of the vanadium ion-containing aqueous solution and the boiling point of the solvent.

16. A method of preparing vanadium oxide particles, comprising:
   (A) preparing a vanadium ion-containing aqueous solution by dissolving vanadium ion-containing material in a hydrogen peroxide aqueous solution or an acid aqueous solution;

(B) adding at least one solvent selected from the group consisting of a non-protonic, polar organic solvent and a glycol solvent to the vanadium ion-containing aqueous solution and mixing the same; and (C) aging the mixture.

17. The method of preparing vanadium oxide particles as claimed in claim 16, wherein, in (B), the non-protonic, polar organic solvent is at least one selected from the group consisting of N-methyl-2-pyrrolidone, N,N-dimethylacetamide, hexamethylphosphoamide, and pyridine, and the glycol solvent comprises at least one selected from the group consisting of ethyleneglycol, propyleneglycol, and butyleneglycol.

18. The method of preparing vanadium oxide particles as claimed in claim 16, wherein the amount of the solvent is in the range of 60–98% by volume based on the total volume of the vanadium ion-containing aqueous solution and the solvent.

19. The method of preparing vanadium oxide particles as claimed in claim 16, wherein the acid aqueous solution is selected from the group consisting of hydrochloric acid aqueous solution, nitric acid aqueous solution, and sulfuric acid aqueous solution.

20. The method of preparing vanadium oxide particles as claimed in claim 16, wherein, in (A), the amount of hydrogen peroxide in the hydrogen peroxide aqueous solution or the amount of the acid in the acid aqueous solution is in the range of 0.5–5 times the vanadium ion-containing material.

\* \* \* \* \*